US012671648B2

(12) United States Patent
Chen et al.

(10) Patent No.: US 12,671,648 B2
(45) Date of Patent: Jun. 30, 2026

(54) METHOD AND SYSTEM FOR TRANSMITTING LINK STATE UPDATE PACKETS

(71) Applicant: HUAWEI TECHNOLOGIES CO., LTD., Shenzhen (CN)

(72) Inventors: Yixiao Chen, Kanata (CA); Farhad Dashti Ardakani, Kanata (CA); Hao Li, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 162 days.

(21) Appl. No.: 18/784,046

(22) Filed: Jul. 25, 2024

(65) Prior Publication Data

US 2026/0032074 A1     Jan. 29, 2026

(51) Int. Cl.
H04L 45/03 (2022.01)
H04L 47/24 (2022.01)

(52) U.S. Cl.
CPC .............. H04L 45/03 (2022.05); H04L 47/24 (2013.01)

(58) Field of Classification Search
CPC ......... H04L 45/03; H04L 45/02; H04L 45/28; H04L 45/12; H04L 45/04; H04L 45/50; H04L 45/123; H04L 45/22; H04L 45/32; H04L 45/16; H04L 41/12; H04L 45/48; H04L 45/42; H04L 45/00; H04L 45/026; H04L 45/24; H04L 45/021; H04L 45/74; H04L 45/64; H04L 45/66; H04L 45/025; H04L 45/54; H04L 45/122; H04L 45/028; H04L 45/26; H04L 45/586; H04L 12/18; H04L 47/125; H04L 12/4641; H04L 45/023; H04L 45/124; H04L 45/18; H04L 45/60; H04L 61/5007; H04L 43/10; H04L 45/745; H04L 45/46; H04L 12/4633; H04L 27/26025; H04L 45/507; H04L 5/0007; H04L 12/462; H04L 45/34; H04L 45/52;

(Continued)

(56) References Cited

U.S. PATENT DOCUMENTS

| 7,065,059 B1 | 6/2006 | Zinin | |
| 2003/0123457 A1* | 7/2003 | Koppol | .................. H04L 45/04 |
| | | | 370/392 |
| 2003/0179742 A1* | 9/2003 | Ogier | ..................... H04L 45/26 |
| | | | 370/389 |

(Continued)

FOREIGN PATENT DOCUMENTS

| CN | 1889531 | 1/2007 |
| CN | 114726771 A | 7/2022 |
| CN | 114785879 A | 7/2022 |

OTHER PUBLICATIONS

International Search Report of PCT/CN2025/103066.

(Continued)

*Primary Examiner* — Djenane M Bayard
(74) *Attorney, Agent, or Firm* — Fasken Martineau DuMoulin LLP; Kimberly Peaslee; Johann Gest

(57)          ABSTRACT

There is provided a method and system for transmitting link state update (LSU) packets containing new link state advertisements (LSAs). In some embodiments, the transmission of the LSU packet is based on the priority of the received LSAs and the status of a pacing timer. In the same or other embodiments, a control stack is generated for tracking the number of unacknowledged LSAs previously transmitted and the interface transmit time interval is adjusted based on the control stack.

18 Claims, 5 Drawing Sheets

(58) Field of Classification Search
CPC ................. H04L 12/1886; H04L 12/28; H04L
43/0852; H04L 43/0829; H04L 65/1069;
H04L 65/80; H04L 43/16; H04L 43/087;
H04L 47/10; H04L 45/304; H04L
41/0816; H04L 41/5003; H04L 47/32;
H04L 2001/0097; H04L 41/0631; H04L
43/50; H04L 47/12; H04L 47/805; H04L
65/1104; H04L 12/66; H04L 27/2602;
H04L 27/261; H04L 27/2636; H04L
5/0028; H04L 5/0053; H04L 5/0091;
H04L 5/1469; H04L 65/1023; H04L
1/0041; H04L 1/0057; H04L 1/08; H04L
1/1614; H04L 1/1671; H04L 1/1685;
H04L 1/1819; H04L 45/583; H04L
45/245
See application file for complete search history.

(56) References Cited

U.S. PATENT DOCUMENTS

| | | | |
|---|---|---|---|
| 2004/0136371 A1* | 7/2004 | Muralidhar | ............. H04L 45/03 |
| | | | 370/389 |
| 2005/0135357 A1 | 6/2005 | Riegel | |
| 2015/0236752 A1* | 8/2015 | Cruz | ................... H04L 63/1441 |
| | | | 375/135 |
| 2017/0366444 A1* | 12/2017 | Ansari | ................. H04L 45/033 |

OTHER PUBLICATIONS

Prioritized Treatment of Specific OSPF Version 2, Packets and
Congestion Avoidance, Network Working Group, Request for Com-
ments: 4222, G. Choudoury, Ed. AT&T, Oct. 2005.

* cited by examiner

200

300

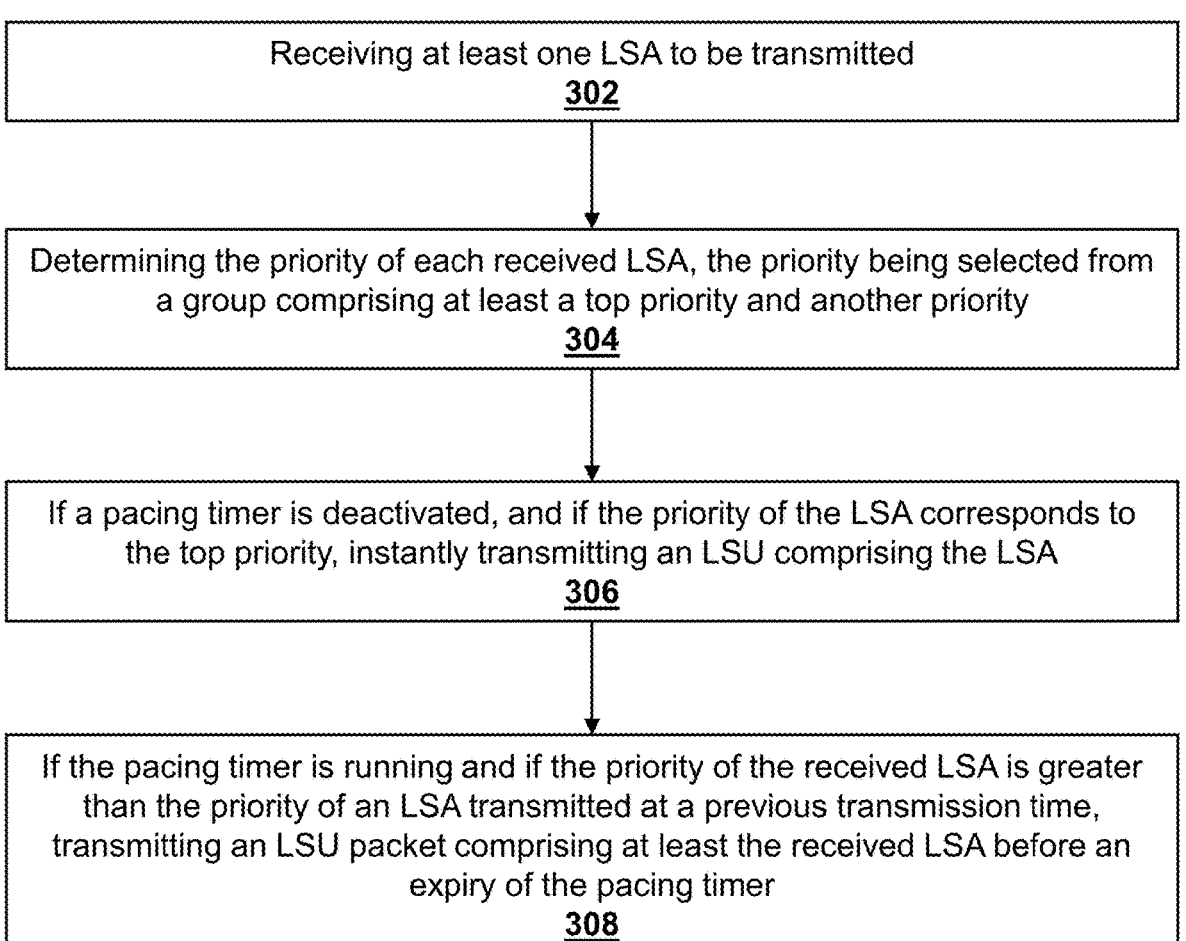

Receiving at least one LSA to be transmitted
302

Determining the priority of each received LSA, the priority being selected from a group comprising at least a top priority and another priority
304

If a pacing timer is deactivated, and if the priority of the LSA corresponds to the top priority, instantly transmitting an LSU comprising the LSA
306

If the pacing timer is running and if the priority of the received LSA is greater than the priority of an LSA transmitted at a previous transmission time, transmitting an LSU packet comprising at least the received LSA before an expiry of the pacing timer
308

FIG. 3

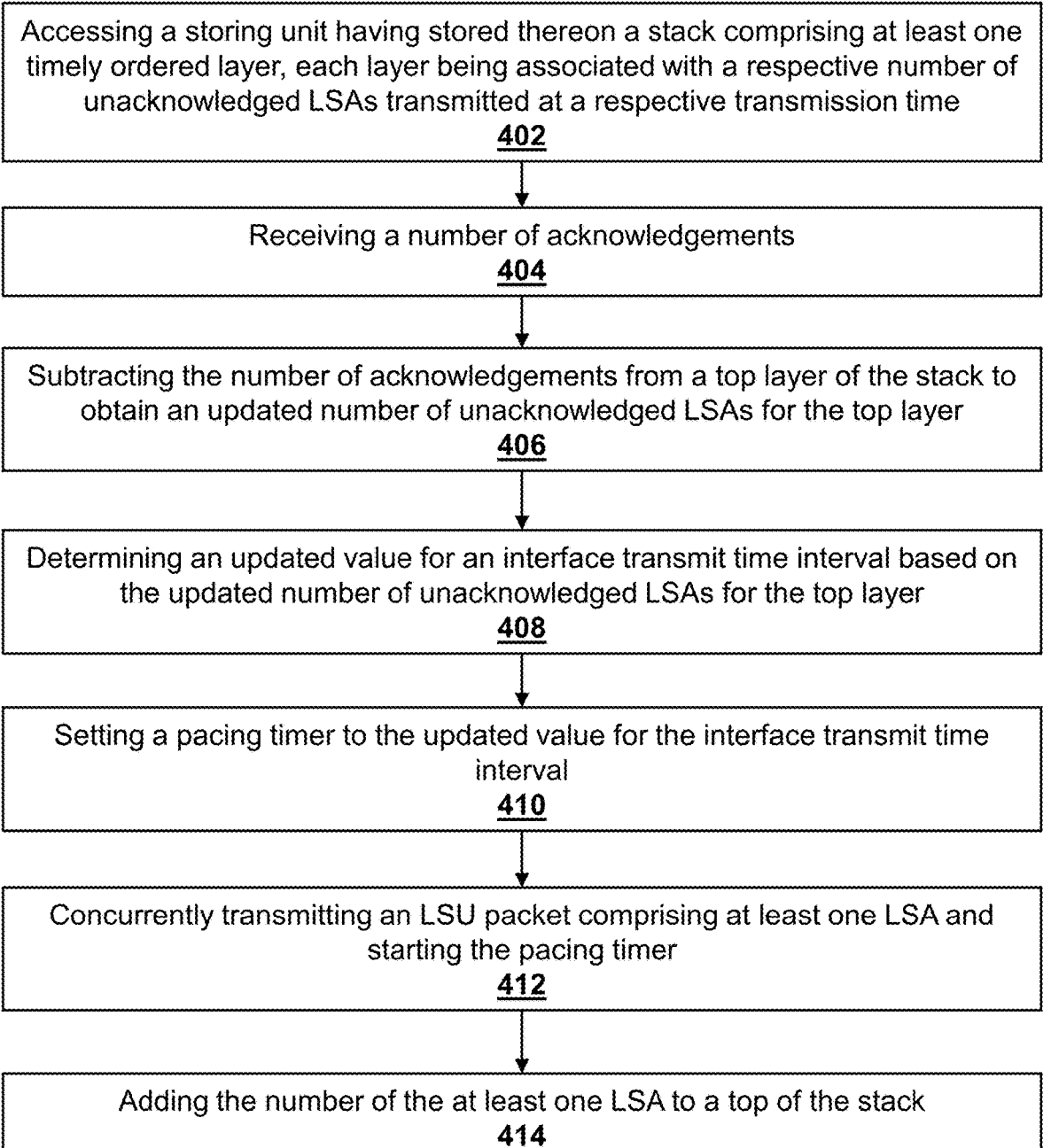

400

Accessing a storing unit having stored thereon a stack comprising at least one timely ordered layer, each layer being associated with a respective number of unacknowledged LSAs transmitted at a respective transmission time
402

Receiving a number of acknowledgements
404

Subtracting the number of acknowledgements from a top layer of the stack to obtain an updated number of unacknowledged LSAs for the top layer
406

Determining an updated value for an interface transmit time interval based on the updated number of unacknowledged LSAs for the top layer
408

Setting a pacing timer to the updated value for the interface transmit time interval
410

Concurrently transmitting an LSU packet comprising at least one LSA and starting the pacing timer
412

Adding the number of the at least one LSA to a top of the stack
414

FIG. 4

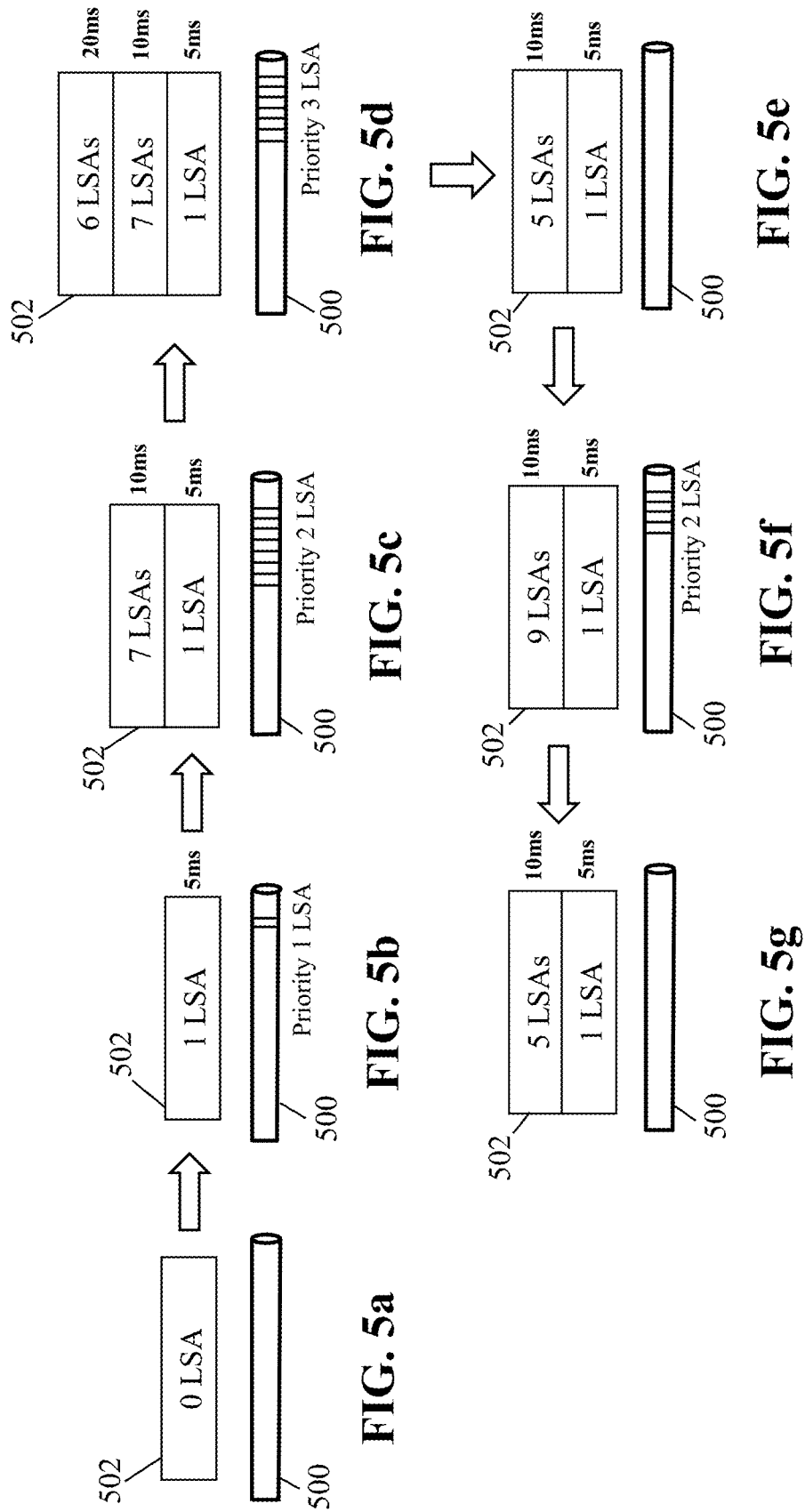

METHOD AND SYSTEM FOR TRANSMITTING LINK STATE UPDATE PACKETS

CROSS-REFERENCE TO RELATED APPLICATIONS

The instant application is the first application regarding the disclosed technology.

FIELD

The present technology relates to the field of transmission of link state update (LSU) packets in a communication network.

BACKGROUND

With the advent of cloud computing over the last few years, fast convergence to network topology changes has emerged as a critical requirement for routing infrastructures. In link-state routing protocols such as Open Shortest Path First (OSPF), when a topology change happens, first the router devices in the vicinity should detect the change. Then the affected routers should originate new link state advertisements (LSAs) and flood them to other routers in the network to make them aware of the recent change. The time that takes for these LSAs to arrive in the destination router depends on the propagation delay of the links between the routers, data transmission rate and also queuing delay of the hops in the path of the LSAs to the destination. When they receive the new LSAs to be transmitted, the destination routers need to run a routing calculation algorithm, e.g., Shortest Path First (SPF), and update their routing and forwarding information tables. Then, the total convergence delay of the network to a topology change can be formulated as expressed in Eq. 1 below:

$$T_{convergence} = \qquad\qquad\qquad\qquad\text{(Eq. 1)}$$

Detection + $LSA$ Origination + $LSA$ Flood + $SPF$ + $RIB/FIB$ Update

Based on Eq. 1, fast convergence of the network to a topology change requires a low or no LSA flooding delay. On the other hand, limiting the processing overhead of the routing protocol and having a stable network is also important. The simultaneous or near-simultaneous flood of a large number of LSAs could cause very high CPU and memory utilization, which may drive the network to an unstable state. Most commercial routers use a fixed transmit time interval (e.g., 100 ms) that specifies the minimum time interval between the consecutive transmissions of link-state update packets. This delay may limit the link capacity consumed by the LSA flooding operations and causes batching together of the LSAs possibly originated by different routers into a few link-state update packets. However, deploying the fixed transmit time interval may lead to a suboptimal performance with varying data traffic patterns and network conditions. The convergence of the network to the topology changes may then be slow. Besides, it may be difficult to get the neighbor cleared from a busy state since the LSA flood rate is a constant value. The busy state results when the neighbor router is receiving more LSAs than it can acknowledge in a reasonable amount of time.

One prior art method recommends that a router network element (NE) checks the number of unacknowledged LSAs from its neighbor routers regularly. Then the router can implicitly detect the congestion at a neighbor router based on the number of unacknowledged LSAs to this router. If the number of unacknowledged LSAs exceeds a certain "high-water mark", then the rate at which LSAs are sent to this router should be reduced progressively using an exponential back-off mechanism but not below a certain minimum rate. At a future time, if the number of unacknowledged LSAs to this router falls below a certain "low-water mark", then the rate of sending LSAs to this router should be increased progressively, again using an exponential back-off mechanism but not above a certain maximum rate. The whole algorithm is given by Eq. 2:

$$G(t+T) = \begin{cases} \min(FG(t), G_{max}) & U(t+T) > H \\ G(t) & H \geq U(t+T) \geq L \\ \max\left(\dfrac{G(t)}{F}, G_{min}\right) & U(t+T) < L \end{cases} \qquad \text{Eq. 2}$$

where U(t) is the number of the unacknowledged LSAs to the neighbor at time t, H is a high-water mark (in units of number of unacknowledged LSAs), L is a low-water mark (in units of number of unacknowledged LSAs), G(t) is a time gap between sending successive Link State Updates (LSUs) to the neighbor at time t, F is a factor by which the above gap is to be increased during congestion and decreased after coming out of congestion, T is the minimum time that has to elapse before the existing time gap is considered for change, which should be greater than the minimum time that the neighbor waits after receiving the LSAs and then sends the acknowledgment out, G_min is the minimum allowed value of time gap, and G_max is the maximum allowed value of time gap.

However, in this method, it may be difficult to determine the engineering value of the parameters, e.g., H, L, and T. For different values of the parameters, the performance of the network in terms of convergence time must be measured and then, the combination of the parameters with the best performance should be chosen, which presents significant complexity. Besides, the values of high-water mark and low-water mark are fixed, which does not guarantee an always optimized performance.

Furthermore, the value of the parameter T needs to be equal to at least one second since it must be greater than the time that the neighbor waits after receiving the LSAs and then sends the acknowledgment packets out. This means the adjustment of the LSA flooding rate is slow which increases the network convergence time.

Therefore, there is a need for an improved method and system for transmitting LSAs.

SUMMARY

It is an object of the present technology to ameliorate at least some of the inconveniences present in the prior art. One or more embodiments of the present technology may provide and/or broaden the scope of approaches to and/or methods of achieving the aims and objects of the present technology.

Developers of the present technology have appreciated that in at least some occasions, fast convergence to network topology changes is important and that improvements to the prior art existing technologies may be made.

To guarantee a fast network convergence to the topology changes, a short flooding time interval is required between consecutive transmission of the LSU packets. On the other hand, in order to get the neighbor out of congestion during the flooding of a large number of LSAs, a long flooding time interval is required. However, it may be difficult to achieve both targets with a fixed flooding time interval.

According to a first broad aspect of the disclosed technology, there is provided a method and system for transmitting LSU packets using a dynamic interface transmit time interval between the consecutive LSU packet transmissions which improves the network convergence delay and helps to get the neighbor out of business during the network congestion. The dynamic interface transmit time interval is introduced to specify the minimum time interval between the consecutive transmissions of the LSU packets and control the rate of the LSA flooding.

In some non-limiting embodiments, there is presented a control stack to track the number of unacknowledged LSAs and adjust the minimum time interval between the consecutive transmissions of the LSU packets.

In some non-limiting embodiments, there is presented a queue of LSAs generated based on priorities assigned to incoming LSAs to be flooded/transmitted. The queue allows for prioritizing the transmission of LSAs based on their type or content. In some embodiments, the dequeuing rate of the LSAs is also dependent on the type or content of the LSA positioned at the head of the queue. Routing information LSAs having the highest priority are inserted into the head of the queue. They may also be transmitted at a higher rate compared to the other types of the LSAs.

In some non-limiting embodiments, the transmission strategy of the LSAs is modified so that the network convergence delay can be improved while the stability of the network is maintained.

In accordance with a first broad aspect, there is provided a method for adjusting a transmit time interval for a transmission of a link state update (LSU) packet, the method being executed by a processor, the method comprising: accessing a storing unit having stored thereon a stack comprising at least one timely ordered layer, each layer being associated with a respective number of unacknowledged link state advertisements (LSAs) previously transmitted at a respective transmission time; receiving, via a communication interface, a given number of acknowledgements; subtracting the given number of acknowledgements from a top layer of the stack, thereby obtaining an updated number of unacknowledged LSAs for the top layer; determining an updated value for an interface transmit time interval based on the updated number of unacknowledged LSAs for the top layer; setting a pacing timer to the updated value for the interface transmit time interval; concurrently transmitting, via the communication interface, a given LSU packet comprising at least one given LSA and starting the pacing timer; and adding a number of the at least one given LSA to a top of the stack.

In some non-limiting embodiments, the step of determining an updated value comprises, when the updated number of unacknowledged LSAs for the top layer is equal to zero: decrementing the interface transmit time interval, thereby obtaining the updated value, the method further comprising removing the top layer from the stack.

In some non-limiting embodiments, when, upon expiry of the pacing timer by full elapsing of the interface transmit time interval, a number of previous acknowledgements received from a previous LSU packet transmission is less than a number of previous LSAs transmitted at the previous LSU packet transmission the step of adding the number of the at least one given LSA comprises: creating a new layer at the top of the stack and assigning the number of the at least one given LSA to the new layer; and said determining an updated value comprises incrementing the interface transmit time interval.

In some non-limiting embodiments, when the pacing timer is terminated before elapsing of the interface transmit time interval, the step of adding the number of the at least one given LSA to the top of the stack comprises: adding the number of the at least one given LSA to an actual top layer of the stack.

In some non-limiting embodiments, the pacing timer is terminated before the elapsing of the interface transmit time interval when a number of acknowledgements received from a previous LSU packet transmission is at least equal to a number of previous LSAs transmitted at the previous LSU packet transmission.

In some non-limiting embodiments, the step of subtracting comprises, when the given number of acknowledgements is greater than the respective number of unacknowledged LSAs of the top layer, subtracting the given number of acknowledgements from the top layer and a second layer.

In some non-limiting embodiments, the method further comprises: determining a highest priority associated with the at least one given LSA; and determining a further value for the interface transmit time interval based on the updated value of the interface transmit time interval and the highest priority, wherein the step of setting the pacing timer comprises setting the pacing timer to the further value for the interface transmit time interval.

In some non-limiting embodiments, when the at least one given LSA comprises a plurality of LSAs, the step of determining the highest priority comprises: determining a respective priority for each one of the plurality of LSAs; queuing the plurality of LSAs according to the respective priority, thereby obtaining a queue of LSAs; and determining the highest priority as being the respective priority of a given of the plurality of LSAs being at the head of the queue of LSAs.

In some non-limiting embodiments, each layer of the stack is further associated with a respective value of the interface transmit time interval.

In accordance with another broad aspect, there is provided a system for adjusting a transmit time interval for a transmission of a link state update (LSU) packet, the system comprising: a processor; a non-transitory storage medium operatively connected to the processor, the non-transitory storage medium comprising computer-readable instructions; the processor, upon executing the instructions, being configured for: accessing a storing unit having stored thereon a stack comprising at least one timely ordered layer, each layer being associated with a respective number of unacknowledged link state advertisements (LSAs) previously transmitted at a respective transmission time; receiving, from a communication interface, a given number of acknowledgements; subtracting the given number of acknowledgements from a top layer of the stack, thereby obtaining an updated number of unacknowledged LSAs for the top layer; determining an updated value for an interface transmit time interval based on the updated number of unacknowledged LSAs for the top layer; setting a pacing timer to the updated value for the interface transmit time interval; concurrently transmitting, via the communication interface, a given LSU packet comprising at least one given LSA and starting the pacing timer; and adding a number of the at least one given LSA to a top layer of the stack.

In some non-limiting embodiments, the processor is configured for, when the updated number of unacknowledged LSAs for the top layer is equal to zero: decrementing the interface transmit time interval, thereby obtaining the updated value, the processor being further configured for removing the top layer from the stack.

In some non-limiting embodiments, the processor is configured for, when, upon expiry of the pacing timer by full elapsing of the interface transmit time interval, a number of previous acknowledgements received from a previous LSU packet transmission is less than a number of previous LSAs transmitted at the previous LSU packet transmission: creating a new layer at the top of the stack and assigning the number of the at least one given LSA to the new layer; and incrementing the interface transmit time interval, thereby obtaining the updated value.

In some non-limiting embodiments, the processor is configured for, when the pacing timer is terminated before elapsing of the interface transmit time interval: adding the number of the at least one given LSA to an actual top layer of the stack.

In some non-limiting embodiments, the pacing timer is terminated before the elapsing of the interface transmit time interval when a number of acknowledgements received from a previous LSA transmission is at least equal to a number of previous LSAs transmitted at the previous LSA transmission.

In some non-limiting embodiments, the processor is configured for, when the given number of acknowledgements is greater than the respective number of unacknowledged LSAs of the top layer, subtracting the given number of acknowledgements from the top layer and a second layer.

In some non-limiting embodiments, the processor is further configured for: determining a highest priority associated with the at least one given LSA; and determining a further value for the interface transmit time interval based on the updated value of the interface transmit time interval and the highest priority, wherein said setting the pacing timer comprises setting the pacing timer to the further value for the interface transmit time interval.

In some non-limiting embodiments, the processor is configured for, when the at least one given LSA comprises a plurality of LSAs: determining a respective priority for each one of the plurality of LSAs; queuing the plurality of LSAs according to the respective priority, thereby obtaining a queue of LSAs; and determining the highest priority as being the respective priority of a given of the plurality of LSAs being at the head of the queue of LSAs.

In some non-limiting embodiments, each layer of the stack is further associated with a respective value of the interface transmit time interval.

In accordance with a further broad aspect, there is provided a method for transmitting a link state update (LSU) packet, the method being executed by a processor, the method comprising: receiving a given link state advertisement (LSA) to be transmitted; determining a given priority associated with the given LSA, the given priority being selected from a group comprising at least a top priority and another priority; if a pacing timer has an inactive status and the given priority corresponds to the top priority, instantly transmitting a given LSU comprising the given LSA; and if the pacing timer is running and the given priority is greater than a previous priority associated with a previous LSA transmitted at a previous transmission time, transmitting a further LSU comprising at least the given LSA before an expiry of the pacing timer.

In some non-limiting embodiments, the top priority is assigned to a content update LSA without traffic engineering extension.

In some non-limiting embodiments, the given priority is selected between the top priority, a medium priority and a low priority.

In some non-limiting embodiments, the medium priority is assigned to a content update LSA with traffic engineering extension.

In some non-limiting embodiments, the low priority is assigned to a refresh LSA.

In some non-limiting embodiments, the step of receiving the given LSA comprises receiving the given LSA and a further LSA, the method further comprising: determining that a further priority associated with the further LSA is different from the top priority and is less than the previous priority associated with the previous LSA transmitted; and queuing the further LSA according to the further priority.

In some non-limiting embodiments, a size of the further LSU corresponds to a maximum transmit unit.

In some non-limiting embodiments, the method further comprises starting the pacing timer set to an interface transmit time interval concurrently with said instantly transmitting the given LSU.

In some non-limiting embodiments, the method further comprises if the given priority is greater than a previous priority: stopping the pacing timer; and starting a new timer set to an interface transmit time interval concurrently with said transmitting the further LSU.

In some non-limiting embodiments, the step of instantly transmitting the given LSU comprises transmitting the given LSU without waiting for a reception of a further LSA.

In accordance with still another broad aspect, there is provided a system for adjusting a transmit time interval for a transmission of a link state update (LSU) packet, the system comprising: a processor; a non-transitory storage medium operatively connected to the processor, the non-transitory storage medium comprising computer-readable instructions; the processor, upon executing the instructions, being configured for: receiving a given link state advertisement (LSA) to be transmitted; determining a given priority associated with the given LSA, the given priority being selected from a group comprising at least a top priority and another priority; if, when a pacing timer has an inactive status, the given priority corresponds to the top priority, instantly transmitting a given LSU comprising the given LSA; and if, when the pacing timer is running, the given priority is greater than a previous priority associated with a previous LSA transmitted at a previous transmission time, transmitting a further LSU comprising at least the given LSA before an expiry of the pacing timer.

In some non-limiting embodiments, the top priority is assigned to a content update LSA without traffic engineering extension.

In some non-limiting embodiments, the given priority is selected between the top priority, a medium priority and a low priority.

In some non-limiting embodiments, the medium priority is assigned to a content update LSA with traffic engineering extension.

In some non-limiting embodiments, the low priority is assigned to a refresh LSA.

In some non-limiting embodiments, the processor is configured for receiving the given LSA and a further LSA, the processor being further configured for: determining that a further priority associated with the further LSA is different from the top priority and is less than the previous priority associated with the previous LSA transmitted; and queuing the further LSA according to the further priority.

In some non-limiting embodiments, a size of the further LSU corresponds to a maximum transmit unit.

In some non-limiting embodiments, the processor is further configured for starting the pacing timer set to an interface transmit time interval concurrently with said instantly transmitting the given LSU.

In some non-limiting embodiments, the processor is further configured for, if the given priority is greater than a previous priority: stopping the pacing timer; and starting a new timer set to an interface transmit time interval concurrently with said transmitting the further LSU.

In some non-limiting embodiments, the processor is configured for transmitting the given LSU without waiting for a reception of a further LSA.

Terms and Definitions

In the context of the present specification, "computing device" is any computing apparatus or computer hardware that is capable of running software appropriate to the relevant task at hand. Thus, some (non-limiting) examples of computing devices include network element routers, general purpose personal computers (desktops, laptops, netbooks, etc.), mobile computing devices, smartphones, and tablets, and network equipment such as routers, switches, and gateways. It should be noted that a computing device in the present context is not precluded from acting as a server to other computing devices. The use of the expression "a computing device" does not preclude multiple computing devices being used in receiving/sending, carrying out or causing to be carried out any task or request, or the consequences of any task or request, or steps of any method described herein. In the context of the present specification, a "client device" refers to any of a range of end-user client computing devices, associated with a user, such as personal computers, tablets, smartphones, and the like.

In the context of the present specification, the expression "computer readable storage medium" (also referred to as "storage medium" and "storage") is intended to include non-transitory media of any nature and kind whatsoever, including without limitation RAM, ROM, disks (CD-ROMs, DVDs, floppy disks, hard drivers, etc.), USB keys, solid state-drives, tape drives, etc. A plurality of components may be combined to form the computer information storage media, including two or more media components of a same type and/or two or more media components of different types.

In the context of the present specification, the expression "information" includes information of any nature or kind whatsoever capable of being stored in a database. Thus, information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a document could include the document itself (i.e. its contents), or it could be a unique document descriptor identifying a file with respect to a particular file system, or some other means of directing the recipient of the indication to a network location, memory address, database table, or other location where the file may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, the expression "communication network" is intended to include a telecommunications network such as a computer network, the Internet, a telephone network, a Telex network, a TCP/IP data network (e.g., a WAN network, a LAN network, etc.), an optical transport network (OTN) control plane, and the like. The term "communication network" includes a wired network or direct-wired connection, and wireless media such as acoustic, radio frequency (RF), infrared and other wireless media, as well as combinations of any of the above.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that the use of the terms "server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

In the context of the present specification, the expression "network element router" refers to any device capable of managing traffic through a network by forwarding a control IP packets.

In the context of the present specification, the expression "interface" refers to through which a computing device such as a network element router is communicating with another computing device such as another network element router in a network.

In the context of the present specification, the expression "routing protocol" refers to a protocol that specifies how computing devices such as network element routers can communicate with each other to distribute information. The routing protocol may be used for identifying network paths.

In the context of the present specification, the expression "packet flooding" refers to the transmission by a computing device such as a network element router of an incoming packet through every outgoing link except the link from which the packet was received.

In the context of the present specification, the expression "acknowledgment" refers to a signal or data transmitted by a first computing device such as a first network element router to a second computing device such as a second network element router after receiving a packet from the second computing device to confirm or acknowledge the reception of the packet.

In the context of the present specification, the expression "hop delay" refers to the time that a data packet takes to move from a computing device such as a network element router to another computing device such as another network element router.

In the context of the present specification, the expression "LSA synchronization" refers to the exchange of LSAs between computing devices such as network element routers. During an LSA synchronization, the LSAs are flooded through the network between two computing devices such as between two network element routers (or multiple computing devices such as multiple network element routers).

In the context of the present specification, the expression "interface transmit time interval" refers to the time gap between two successive transmissions of an LSU packet at a given interface. It will be understood that different interfaces may have different interface transmit time intervals. In some embodiments, the interface transmit time interval has a predefined constant value to which a pacing timer is set, as described below. In other embodiments, the value of the interface transmit time interval is dynamically adjusted, and the pacing timer is set either to this dynamic value or to a pace scaled version thereof, as described below.

In the context of the present specification, the expression "pacing timer" refers to a timer used for tracking time elapsed since the transmission of an LSU packet to a neighbor. The pacing timer is usually set to an interface transmit time interval.

In the context of the present specification, a pacing timer is said to naturally pop when upon expiry of the pacing timer by full elapsing of the transmit time interval, the number of acknowledgements received from a previous LSU packet transmission is less than the number of LSAs included in the previous LSU packet transmitted at the previous LSU packet transmission.

In the context of the present specification, a pacing timer is said to be forced popped when the pacing timer is terminated or stopped before its associated transmit time interval fully elapses. In some non-limiting embodiments, the pacing timer is terminated before its associated transmit time interval fully elapses when the number of acknowledgements received from a previous LSU packet transmission is at least equal to the number of LSAs included in the previous LSU packet transmitted at the previous LSU packet transmission.

Embodiments of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of embodiments of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 3 depicts a flow chart of a first method for transmitting LSU packets, in accordance with one or more non-limiting embodiments of the present technology.

FIG. 4 depicts a flow chart of a second method for transmitting LSU packets, in accordance with one or more non-limiting embodiments of the present technology.

FIGS. 5a to 5g depicts a schematic diagram of an example of the execution of the methods of FIGS. 3 and 4, in accordance with one or more non-limiting embodiments of the present technology.

DETAILED DESCRIPTION

Figure 1:
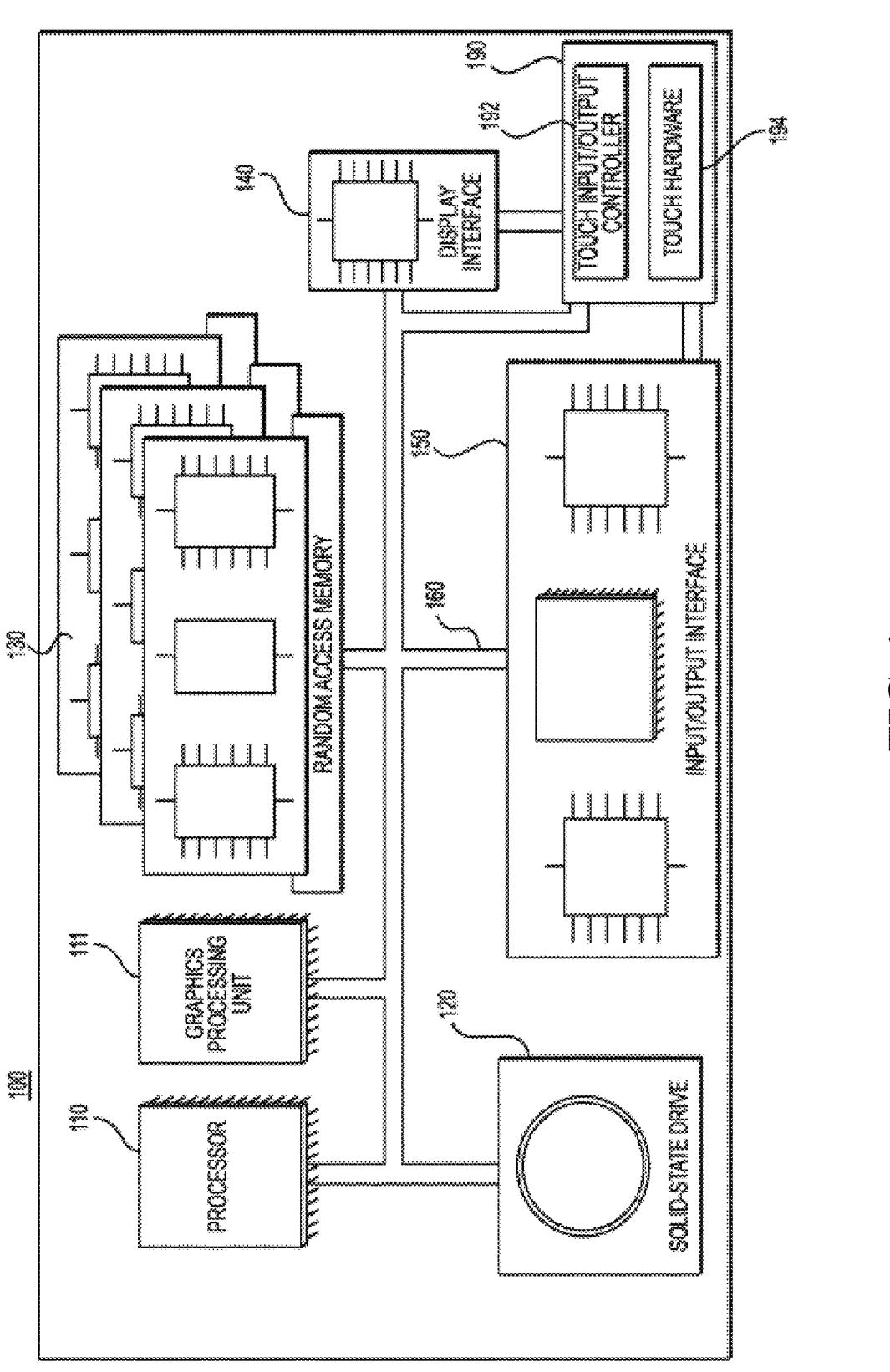
FIG. 1 depicts a schematic diagram of a computing device, in accordance with one or more non-limiting embodiments of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified embodiments of the present technology. As persons skilled in the art would understand, various embodiments of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and embodiments of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor" or a "graphics processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In one or more non-limiting embodiments of the present technology, the processor may be a general-purpose processor, such as a central processing unit (CPU), a processor dedicated to a specific purpose, such as a graphics processing unit (GPU), a neural network processor, or the like. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various embodiments of aspects of the present technology.

Computing Device

Referring to FIG. 1, there is shown a computing device 100 suitable for use with some embodiments of the present technology, the computing device 100 comprising various hardware components including one or more single or multi-core processors collectively represented by processor 110, a graphics processing unit (GPU) 111, a solid-state drive 120, a random-access memory 130, a display interface 140, and at least one communication or input/output interface 150.

In some limiting embodiments, the computing device 100 is a router network element.

Communication between the various components of the computing device 100 may be enabled by one or more internal and/or external buses 160 (e.g., a PCI bus, universal serial bus, IEEE 1394 "Firewire" bus, SCSI bus, Serial-ATA bus, etc.), to which the various hardware components are electronically coupled.

The input/output interface 150 may be coupled to a touchscreen 190 and/or to the one or more internal and/or external buses 160. The touchscreen 190 may be part of the display. In one or more embodiments, the touchscreen 190 is the display. The touchscreen 190 may equally be referred to as a screen 190. In the embodiments illustrated in FIG. 1, the touchscreen 190 comprises touch hardware 194 (e.g., pressure-sensitive cells embedded in a layer of a display allowing detection of a physical interaction between a user and the display) and a touch input/output controller 192 allowing communication with the display interface 140 and/or the one or more internal and/or external buses 160. In one or more embodiments, the input/output interface 150 may be connected to a keyboard (not shown), a mouse (not shown) or a trackpad (not shown) allowing the user to interact with the computing device 100 in addition or in replacement of the touchscreen 190.

According to embodiments of the present technology, the solid-state drive 120 stores program instructions suitable for being loaded into the random-access memory 130 and executed by the processor 110 and/or the GPU 111. For example, the program instructions may be part of a library or an application.

The computing device 100 may be implemented as a server, a desktop computer, a laptop computer, a tablet, a smartphone, a personal digital assistant or any device that may be configured to implement the present technology, as it may be understood by a person skilled in the art.

System

Figure 2:
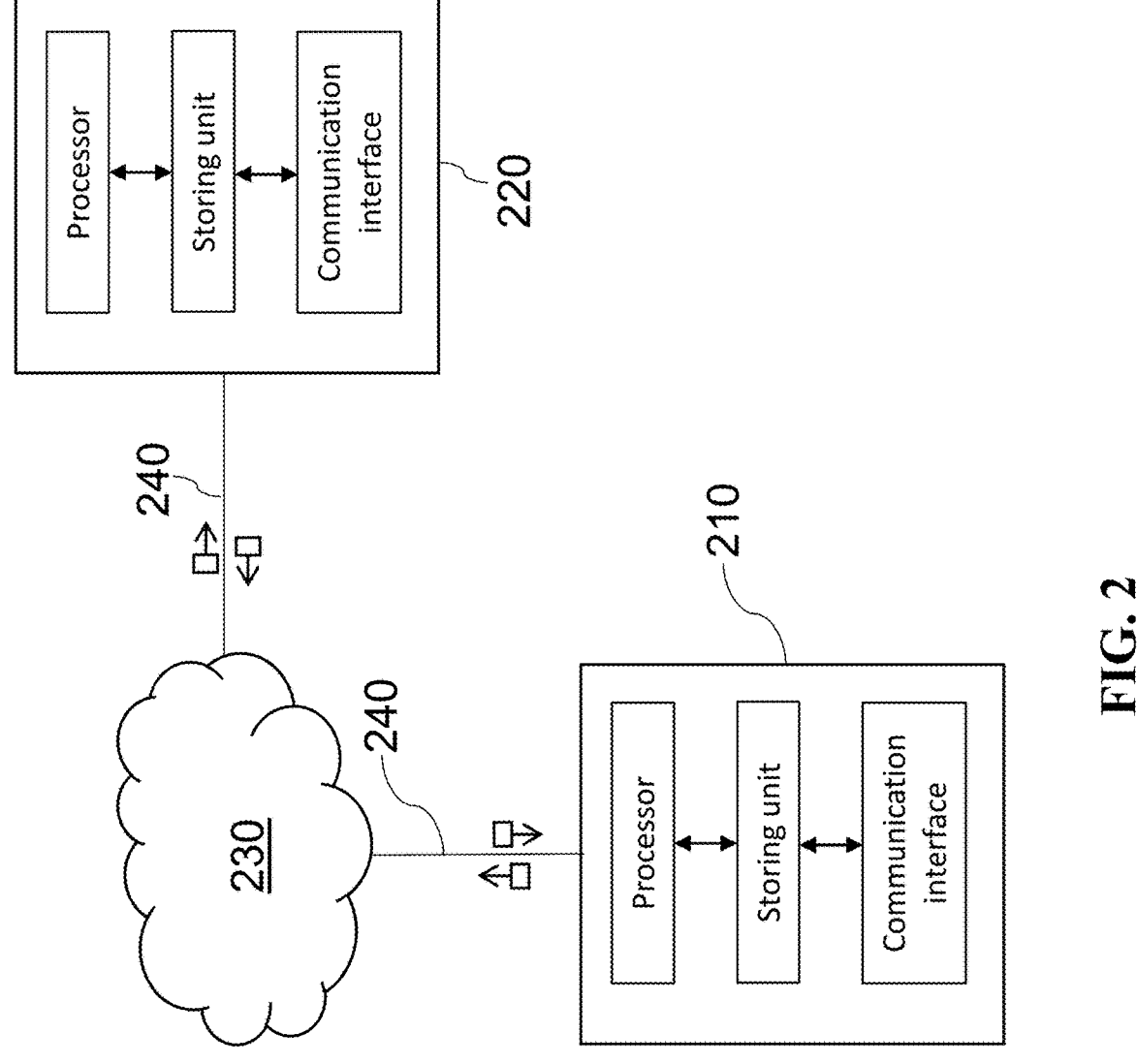
FIG. 2 depicts a schematic diagram of a communication system, in accordance with one or more non-limiting embodiments of the present technology.

Referring to FIG. 2, there is shown a schematic diagram of a system 200, the system 200 being suitable for implementing one or more non-limiting embodiments of the present technology. It is to be expressly understood that the system 200 as shown is merely an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 200 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition, it is to be understood that the system 200 may provide in certain instances simple embodiments of the present technology, and that where such is the case they have been presented in this manner as an aid to understanding. As persons skilled in the art would understand, various embodiments of the present technology may be of a greater complexity.

The system 200 comprises inter alia a first computing device 210 and at least one second computing device 220 communicatively coupled over a communication network 230.

First Computing Device 210

The first computing device 210 comprises at least a processor or processing unit, a storing unit and a communication interface and may comprise one or more components of the computing device 100 such as one or more single or multi-core processors collectively represented by processor 110, the graphics processing unit (GPU) 111, the solid-state drive 120, the random-access memory 130, etc.

In some non-limiting embodiments, the first computing device 210 comprises a router network element.

In some embodiments, the first computing device 210 is configured to inter alia:
receive an LSA to be transmitted;
determine the priority of the received LSA, the priority being selected from a group comprising at least a top priority and another priority;
if, when a pacing timer has an inactive status, the priority corresponds to the top priority, instantly transmit an LSU comprising the received LSA; and
if, when the pacing timer is running, the priority is greater than the priority of a previous LSA transmitted at a previous transmission time, transmit an LSU comprising at least the received LSA before an expiry of the pacing timer.

In the same or other embodiments, the first computing device 210 is configured to inter alia:
access a storing unit having stored thereon a stack comprising at least one timely ordered layer, each layer being associated with a respective number of unacknowledged LSAs previously transmitted each at a respective transmission time;

receive, via a communication interface, a number of acknowledgements;

subtract the number of acknowledgements from a top layer of the stack to obtain an updated number of unacknowledged LSAs for the top layer;

determine an updated value for an interface transmit time interval based on the updated number of unacknowledged LSAs for the top layer;

set a pacing timer to the updated value for the interface transmit time interval; and concurrently transmit, via the communication interface, an LSU packet comprising at least one LSA and start the pacing timer; and add a number of the at least one LSA to a top of the stack.

In some embodiments, the stack is stored locally on the storing unit of the first computing device 210. In other embodiments, the stack is remotely stored on a remote storing unit accessible by the first computing device 210.

In some embodiments, the first computing device 210 is configured to execute both above-described methods.

Second Computing Device 220

The second computing device 220 comprises at least a processor, a storing unit and a communication interface and may comprise one or more components of the computing device 100 such as one or more single or multi-core processors collectively represented by processor 110, the graphics processing unit (GPU) 111, the solid-state drive 120, the random-access memory 130, etc.

In some non-limiting embodiments, the second computing device 220 comprises a router network element.

In some embodiments, the second computing device 220 is configured to inter alia: receive LSUs comprising LSAs from the first computing device 210 and optionally transmit, to the first computing device 210, an acknowledgement for each received LSA.

In some embodiments in which the first computing device 210 is in communication with more than one second computing device 220, the first computing device 210 comprises a respective communication interface or link for each second computing device 220 with which it is in communication, and the herein described method are independently executed by the first computing device 210 for each communication interface or link.

Communication Network

In one or more embodiments of the present technology, the communications network 230 is the Internet. In one or more alternative non-limiting embodiments, the communication network 230 may be implemented as any suitable local area network (LAN), wide area network (WAN), a private communication network, an optical transport network (OTN) control plane or the like. It will be appreciated that embodiments for the communication network 230 are for illustration purposes only. How a communication link 240 (not separately numbered) between the first computing 210, the second computing device 220, and/or another computing device (not shown) and the communications network 230 is implemented will depend inter alia on how each computing device is implemented.

The communication network 230 may be used to transmit data packets amongst the first computing 210 and the second computing device 220. For example, the communication network 230 may be used to transmit LSUs comprising LSAs from the first computing device 210 to the second computing device 220. In another example, the communication network 230 may be used to transmit LSA acknowledgments from the second computing device 220 to the first computing device 210.

Method Description

FIG. 3 depicts a flowchart of a method 300 for transmitting an LSU packet, in accordance with one or more non-limiting embodiments of the present technology.

The processing device or processor of the first computing device 210, upon executing the computer-readable instructions, is configured to or operable to execute the method 300.

The method 300 begins at processing step 302. It should be understood that the method 300 is executed by the processing device of the first computing device 210.

According to processing step 302, the processing device receives at least one LSA to be transmitted to the second computing device 220. In some embodiments, the LSA is received from another computing device such as another router network element via the communication network 230.

According to processing step 304, the processing device determines the priority associated with each received LSA. In some embodiments, the processing device analyses the type or content of each received LSA and determines the priority for each received LSA based on its content or type. The processing device selects the priority to be assigned to an LSA between a top priority and at least another priority.

In some embodiments, the processing device selects the priority between a top priority, a medium or regular priority and a low priority.

In some embodiments, the top priority is assigned to content-update LSAs without traffic engineering (TE) extensions, such as open shortest path first (OSPF) type 1 to type 7 LSAs.

In some embodiments, the regular or medium priority is assigned to content-update LSAs with traffic engineering (TE) extensions, such as OSPF type 10 LSAs.

In some embodiments, the low priority is assigned to refresh LSAs, e.g., LSAs of which the content remains unchanged apart from the header thereof.

Referring back to FIG. 3 and according to processing step 306, the processing device instantly generates and transmits an LSU packet comprising the received LSA to the second computing device 220 via a communication interface dedicated to communications with the second computing device 220 when the two following conditions are met:

if a pacing timer has an inactive status when the LSA is received and/or when the priority of the received LSA is determined; and if the determined priority of the received LSA corresponds to the top priority.

It should be understood that the expression "instantly" means without any delay and/or without waiting for any further LSA to be received by the first computing device 210, i.e., as soon as an LSA is received with the two above conditions being met, the processing device generates and transmits the LSU containing the received LSA without any delay and/or without waiting for the reception of any further LSA.

It should be understood that, as known in the art, each time an LSU packet is transmitted, a pacing timer set to the interface transmit time interval is started concurrently to the transmission of the LSU. The interface transmit time interval sets the time duration between the present LSU transmission and the next LSU packet transmission.

A pacing timer is considered to have an inactive status once it has naturally popped or once it was forced popped. If the timer pops (naturally or forcedly) and there is no LSA to be transmitted, the pacing timer remains in its inactive state until the transmission of a further LSU. The pacing timer is then set to a desired interface transmit time interval and activated/started concurrently with the transmission of the LSU packet.

If the timer pops naturally or forcedly and there is at least one LSA to be transmitted, a further LSU is generated and transmitted while the pacing timer is set to a desired interface transmit time interval and activated/started concurrently with the transmission of the LSU packet.

It should be understood that, at step 306, the pacing timer is activated, set to the interface transmit time interval and started concurrently with the transmission of the LSU packet.

It should also be understood that the processing device stores in memory each received LSA. In some embodiments, the processing unit deletes the stored LSAs once they have been transmitted to the second computing device.

It should further be understood that the processing device stores in memory a priority associated with the transmission of an LSU packet to the second computing device 220. When the transmitted LSU packet comprises a single LSA, the determined priority of the single LSA is stored in memory and associated with the LSU transmission. When the transmitted LSU packet comprises a plurality of LSAs all having the same given priority, the given priority is stored in memory and associated with the LSU transmission. When the transmitted LSU packet comprises LSAs having different priorities, the highest priority is stored in memory and associated with the LSU transmission.

According to processing step 308, the processing device generates an LSU packet comprising at least the received LSA and transmits the LSU packet to the second computing device 220 before the expiry or end of the pacing timer when the two following conditions are met:

the pacing timer, started concurrently with the transmission of a previous LSU packet, is still running, i.e., the interface transmit time interval started from the previous LSU packet transmission has not yet lapsed; and the priority of the received LSA is greater than the priority associated with the previous transmission of an LSU packet.

It should be understood that, when it is determined that the received LSA has a priority which is greater than the priority associated with the previous LSU transmission, the running pacing timer is stopped, reset to the interface transmit time interval and restarted concurrently with the transmission of the LSU packet.

In some embodiments, the LSU packet only comprises the received LSA.

In other embodiments, the LSU packet comprises the received LSA and at least another LSA. For example, if the priority associated with the previously transmitted LSU is a low priority and the computing device 210 receives one regular priority LSA and two low priority LSAs, the generated LSU may comprise the regular priority LSA and two low priority LSAs.

In some non-limiting embodiments, the processing device may generate a queue of received LSAs in which the LSAs are ordered according to their respective priority, i.e., the LSAs having the highest priority being positioned at the head of the queue while the LSAs having the lowest priority being positioned at the tail of the queue. The processing device then transmits LSAs based on their respective position within the queue, i.e., the LSAs having the highest priority are transmitted before lower priority LSAs.

In some embodiments, the LSU packet transmitted at step 308 comprises more than the received LSA. For example, if given LSAs having a priority lower than the priority of the received LSA are in the queue, the LSU packet generated and transmitted at step 308 may comprise the received LSA and at least some of the given LSAs present in the queue. In some embodiments, the size of the transmitted LSU is at most equal to a predefined maximum transmit unit.

In some non-limiting embodiments, the interface transmit time interval to which the pacing timer is set for each LSU packet transmission is fixed and does not vary in time. In other embodiments, the interface transmit time interval may vary in time. An exemplary method for dynamically adjusting the interface transmit time interval in time is provided below.

Similarly, in some non-limiting embodiments, the maximum transmit unit of a transmitted LSU packet, i.e., the maximum size for an LSU packet to be transmitted, is fixed and does not vary in time. In other embodiments, the maximum transmit unit may vary in time. An exemplary method for dynamically adjusting the maximum transmit unit in time is provided below.

It should be understood that the method 300 may comprise further steps.

As described above, each time an LSU packet is transmitted, the pacing timer set to the interface transmit time interval is concurrently started. During the interface transmit time interval, the first computing device 210 may receive LSA acknowledgments from the second computing device 220, count the number of received LSA acknowledgments and compare the number of received LSA acknowledgments to a predefined threshold.

In some embodiments, the predefined threshold is set to the number of LSAs included into the previous LSU packet transmitted to the second computing device 220.

If, at the end of the interface transmit time interval, the number of received LSA acknowledgments is less than the predefined threshold, e.g., less than the number of LSAs included into the previous LSU packet, the pacing timer is said to have naturally popped. In this case, when the pacing timer naturally pops, the processing device generates a new LSU packet containing LSAs that were not included into the previously sent LSU packet or were received after the transmission of the previously sent LSU packet, resets the pacing timer to the interface transmit time interval and concurrently transmits the new LSU packet to the second computing device 220 and starts the pacing timer. In some embodiments, the size of the new LSU packet is set to the maximum transmit unit.

If before the end of the interface transmit time interval, i.e., before the end or expiry of the pacing timer, the number of received LSA acknowledgments becomes equal to the predefined threshold, e.g., equal to the number of LSAs included into the previous LSU packet, then the processing device stops the pacing timer (the pacing timer is said to be forced popped), generates a new LSU packet containing LSAs that were not included into the previously sent LSU packet or were received after the transmission of the previously sent LSU packet, resets the pacing timer to the interface transmit time interval and concurrently transmits the new LSU packet to the second computing device 220 and starts the pacing timer. In some embodiments, the size of the new LSU packet is set to the maximum transmit unit.

In some embodiments in which received LSAs are queued according to their determined priority, the processing device continuously determines the total size of the queued LSAs. When the total size of the queued LSAs reaches a predefined threshold such as the maximum transmit unit, the processing device stops the actual pacing timer and generates a new LSU packet while favoring the highest priority LSAs present in the queue and transmits the generated LSU packet to the second computing device 220 while concurrently starting a new pacing timer set to the interface transmit time interval. In some embodiments, the size of the new LSU packet is set to the maximum transmit unit.

It should be understood that, when the first computing device 210 is in communication with a plurality of second computing devices 220 each via a respective interface, the method 300 is executed by the processing device of the first computing 210 for each interface independently. It should also be understood that the values of the above-mentioned parameters such as the predefined thresholds, the maximum transmit unit, the interface transmit time interval and/or the like may be specific to each interface.

As described above, the method 300 allows for transmitting LSAs based on their type or content. LSAs having a higher priority are prioritized and transmitted first. In embodiments in which a queue of LSAs to be transmitted is generated, the dequeuing rate of the LSAs, i.e., the LSA transmission pace, is performed based on their respective priority which has been previously determined based on their type or content. The dequeuing rate of top priority LSAs is the greatest since the flooding of these LSAs throughout the network may affect the network convergence time. Also, the transmission of LSAs according to steps 306 and 308 allows the flooding of top priority LSAs that may affect the network convergence delay.

In some non-limiting embodiments, the method 300 allows for improving the network convergence delay while maintaining the network stability.

FIG. 4 depicts a flowchart of a method 400 for transmitting an LSU packet, in accordance with one or more non-limiting embodiments of the present technology. As described in greater detail below, the method 400 allows for a dynamic adjustment of the interface transmit time interval based on the number of received LSA acknowledgements.

The processing device or processor of the first computing device 210, upon executing the computer-readable instructions, is configured to or operable to execute the method 400.

The method 400 begins at processing step 402.

According to processing step 402, the processing device accesses a memory or storing unit on which a control stack of values is stored. The control stack comprises at least one layer or entry and a respective number of unacknowledged LSAs is associated with each layer or entry. Each layer corresponds to a respective LSU packet that was transmitted at a respective transmission time and the respective number of unacknowledged LSAs associated with a layer corresponds to a number of transmitted LSAs minus a number of received LSA acknowledgments. The control stack is used by the processing device to keep track of the number of LSAs that have been transmitted but for which no acknowledgement has been received.

As described in greater detail below, each time the processing device transmits an LSU packet comprising a given number of LSAs to the second computing device 220 via the communication interface, the given number of transmitted LSAs is added at the top of the stack. As described in greater detail below, in some embodiments, the given number of transmitted LSAs is added to the actual top layer of the stack (i.e., no new top layer is created) while in other embodiments, a new layer or entry is created at the top of the control stack and the given number of transmitted LSAs is added to the newly created top layer.

It should be understood that the memory may be an internal component of the first computing device 210. Alternatively, the memory may be a component external to the first computing device 210. In this case, the first computing device 210 is in communication with the external memory.

According to processing step 404, a given number of LSA acknowledgements is received from the second computing device 220 via the communication interface. The processing device is configured for counting the number of LSA acknowledgments received from the transmission of the previous LSU packet. As described above, each time an LSU packet is transmitted via the communication interface, a pacing timer set to the interface transmit time interval is concurrently started. The processing device starts counting the number of LSA acknowledgements received from the second computing device starting from the transmission time of the LSU packet.

According to processing step 406, the processing device subtracts the number of LSA acknowledgements from the top layer of the control stack, i.e., from the number of unacknowledged LSAs associated with the top layer, thereby obtaining an updated number of unacknowledged LSAs.

According to processing step 408, the processing device determines a new value for the interface transmit time interval based on the updated number of unacknowledged LSAs associated with the top layer of the control stack.

In some embodiments in which the updated number of unacknowledged LSAs associated with the top layer is equal to zero, the processing device decrements the interface transmit time interval, i.e., decreases the value of the interface transmit time interval, thereby obtaining the new value for the interface transmit time interval. In some embodiments, the value of the interface transmit time interval is decreased by a predefined amount. For example, the value of the interface transmit time interval may be decreased by 5 ms, 10 ms, etc. In other embodiments, the interface transmit time interval may be set to the time elapsed until the pacing timer was forced popped. In other embodiments, the value of the interface transmit time interval is divided by a factor of which the value is greater than 1. In some embodiments, the value of the factor is predefined. For example, the value of the predefined factor may be set to 2.

In some embodiments in which the number of LSA acknowledgements received at step 404 is greater than the number of unacknowledged LSAs associated with the top layer of the control stack, the number of LSA acknowledgements is subtracted from the top layer and at least the second top layer, i.e., the number of LSA acknowledgements is subtracted from the number of unacknowledged LSAs associated with the top layer (which becomes zero) and the remaining is subtracted from the unacknowledged LSAs associated with the second-to-top, or penultimate, layer. Since the number of unacknowledged LSAs associated with the top layer is now zero, the processing device deletes the top layer, and the penultimate layer becomes the top layer of the control stack.

According to processing step 410, the value of the pacing timer is set to new value of the interface transmit time interval.

According to processing step 412, an LSU packet containing at least one LSA is transmitted to the second processing device 220 via the communication interface and the pacing timer is concurrently started.

According to processing step 414, the processing device then adds the number of LSAs contained in the LSU packet transmitted at step 412 to the top of the control stack.

In embodiments in which the previous pacing timer naturally popped, the processing device is further configured for creating a new layer at the top of the control stack and assigning the number of LSAs contained in the LSU packet transmitted at step 412 to the newly created top layer. As described above, the pacing timer naturally pops when at the end of the previous interface transmit time interval, the number of received LSA acknowledgments is less than a predefined threshold such as less than the number of LSAs included into the previously transmitted LSU packet. Furthermore, each time the pacing timer naturally pops, the processing device is configured for incrementing the interface transmit time interval, i.e., increasing the value of the interface transmit time interval. In some embodiments, the value of the interface transmit time interval is increased or incremented by a predefined amount. For example, the value of the interface transmit time interval may be increased by 5 ms, 10 ms, etc. In other embodiments, the value of the interface transmit time interval is multiplied by a factor of which the value is greater than 1. In some embodiments, the value of the factor is predefined.

In some embodiments, the same value of the factor is used for both increasing and decreasing the value of the interface transmit time interval. For example, the factor may be equal to 2.

It should be understood that, before the transmission of a first LSU packet, the interface transmit time interval is set to an initial value such as 5 ms.

In some embodiments, the value the interface transmit time interval must be comprised between a predefined minimum value and a predefined maximum value. If during the execution of the method 400, the calculated value for the interface transmit time interval is below the predefined minimum value, the processing device sets the value of the interface transmit time interval to the predefined minimum value. Similarly, if the calculated value for the interface transmit time interval is above the predefined maximum value, the processing device sets the value of the interface transmit time interval to the predefined maximum value. In some embodiments, the predefined minimum value for the interface transmit time interval is set to the initial value.

In some non-limiting embodiments, setting the predefined minimum value to a high value may cause delays in the LSA flooding under optimal conditions where the second computing device 220 promptly transmits acknowledgments for all LSAs received from the first computing device 210 within the interface transmit time interval. Therefore, in some embodiments, the predefined minimum value is chosen to be low enough to expedite LSA flooding, particularly in scenarios where the network is operating optimally. In some embodiments, the predefined minimum value is set to 5 ms.

In some non-limiting embodiments, while the predefined maximum value helps the nodes of the network to get out of congestion, a large predefined maximum value may significantly delay the LSA flooding. In some embodiments, the predefined maximum value is set to 2,000 ms which can be fine-tuned during testing the proposed scheme in a large network with many computing devices.

It will be understood that the factor by which the interface transmit time interval is divided or multiplied determines how fast the interface transmit time interval reaches its maximum value and therefore delay the LSA flooding during network congestion, and also determines how fast the interface transmit time interval returns to its minimum value and continues LSA flooding when the network is free.

In embodiments in which the previous pacing timer was forced popped, i.e., when the number of received LSA acknowledgments is at least equal to a predefined threshold such as at least equal to the number of LSAs included into the previously transmitted LSU packet, the processing device is configured to add the number of LSAs contained in the LSU packet transmitted at step 412 to the top layer of the control stack, i.e., to add the number of LSAs contained in the LSU packet transmitted at step 412 to the number of unacknowledged LSAs associated with the top layer, without creating any new top layer.

It should be understood that if no LSA acknowledgement is received at step 402, then the number of unacknowledged LSAs associated with the top layer of the control stack remains unchanged.

In some non-limiting embodiments, the processing device is further configured for determining a priority for each LSA to be transmitted and dynamically adjusting the value of the pacing timer based on a determined priority and the value of the interface transmit time interval determined at step 408. In this case, the processing device determines a priority for each LSA contained in LSU packet transmitted at step 412 and assigns a given priority to the LSU packet. In some non-limiting embodiments, the method for assigning a priority to an LSA described above with respect to method 300 can be used. In embodiments in which all LSAs included in the LSU packet have the same priority, this priority is assigned to the LSU packet. In embodiments in which the LSAs included in the LSU packet have different priorities, the processing device assigns the highest priority to the LSU packet. In some embodiments, the processing device is further configured for creating a queue of LSAs to be transmitted based on the priority determined for each LSA to be transmitted, as described above with respect to method 300. The LSAs to be transmitted are positioned within the queue based on their respective priority, the highest priority LSAs being at the head of the queue and the lowest priority LSAs being at the tail of the queue. In this case, the priority assigned to the LSU packet corresponds to the priority of the LSAs located at the head of the queue.

The processing device then calculates an updated value for the interface transmit time interval based on the previously determined value for the interface transmit time interval and the priority assigned to the LSU packet. In some embodiments, the updated value for the interface transmit time interval is obtained by adding a predefined given amount to the previously determined value of the interface transmit time interval. The predefined given amount may vary depending on the priority associated with the LSU packet. For example, the predefined given amount may be 0 ms when the priority assigned to the LSU packet is the top priority, the predefined given amount may be 15 ms when the priority assigned to the LSU packet is the regular priority, and the predefined given amount may be 50 ms when the priority assigned to the LSU packet is the low priority. In some other embodiments, the updated value for the interface transmit time interval is obtained by multiplying the previously determined value of the interface transmit time interval by a factor of which the value may vary depending on the priority assigned to the LSU packet. For example, the value of the factor may increase while the priority assigned to the LSU packet decreases. For example, the value of the factor may be equal to 1 when the priority assigned to the LSU packet is the top priority, the value of the factor may be equal to 3 when the priority assigned to the LSU packet is the regular priority, and the value of the factor may be equal to 10 when the priority assigned to the LSU packet is the low priority.

In embodiments in which the method 400 comprises the step of calculating an updated value for the interface transmit time interval, the step 410 consists in setting the pacing timer to the updated value for the interface transmit time interval.

In some embodiments, the processing device is further configured for assigning a interface transmit time interval value to each layer of the control stack. Each time it creates a new top layer at the top of the control stack, the processing device assigns the value of the interface transmit time interval to the top layer in addition to the number of transmitted LSAs.

In some embodiments, the processing device is further configured for dynamically adjusting the value of the transmit packet limit. In this case, each time it increases the value of the interface transmit time interval, the processing device further decreases the value of the transmit packet limit. Each time it decreases the value of the interface transmit time interval, the processing device further increases the value of the transmit packet limit. The increase and decrease of the value of the transmit packet limit may be obtained by adding a predefined amount to the value of the transmit packet limit and subtracting a predefined amount from the value of the transmit packet limit, respectively. In another example, the increase and decrease of the value of the transmit packet limit may be obtained by multiplying the value of the transmit packet limit by a factor and dividing the value of the transmit packet limit by a factor, respectively. In some embodiments, the value of the transmit packet limit cannot be less than a predefined minimum value and cannot exceed a predefined maximum value.

It should be understood that the order in which the steps of the method 400 are presented is exemplary only. For example, step 404 may be executed after step 402.

It should be understood that the processing device of the computing device 210 may concurrently execute both methods 300 and 400 presented above.

In the following an example of the concurrent execution of the methods 300 and 400 is presented with respect to FIGS. 5a to 5g. In this example, the processing device generates a control stack and a queue as described above.

FIG. 5a illustrates the beginning of the exemplary method, at time to, when the queue 500 is empty, i.e., there is no LSA to be transmitted (the queue is empty) and the stack 502 is empty (or comprises a single layer with no number assigned thereto or a zero number assigned thereto) the pacing timer has an inactive status and the value of the interface transmit time interval is set to an initial value, i.e., 5 ms. The pacing timer has an inactive status at the initialisation of the first computing device. The pacing timer may also have an inactive status when a previous pacing timer was naturally popped or forced popped and the queue is empty.

At time $t_1$ and as illustrated in FIG. 5b, one LSA having a top priority is received and inserted at the head of the queue 500 since it has a top priority. Also, because the received LSA is a top priority LSA, the processing device generates a first LSU packet that comprises the received LSA and instantly transmits the first LSU packet to the second computing device 220 according to step 306 of method 300, while concurrently starting the pacing timer set to the initial value of the interface transmit time interval, i.e., 5 ms. The processing device further creates a layer in the control stack 502 (which becomes the top layer since it is the single layer contained in the control stack 502) and assigns to the top layer the number of LSAs included in the first LSU packet, i.e., the number 1. The processing further assigns the actual value of the interface transmit time interval, i.e., 5 ms, to the top layer of the control stack 502.

At time $t_2$ and as illustrated in FIG. 5c, the pacing timer naturally pops since no LSA acknowledgement has been received since the transmission of the first LSU packet while in the meantime, 7 regular priority LSAs have been received by the first computing device 210. The 7 received LSAs are inserted at the head of the queue 500 since there is no other LSA present in the queue 500. Since the pacing timer naturally popped, the processing device creates a new top layer at the top of the control stack 502 and increases the value of the interface transmit time interval. In the present example, the processing device multiplies the value of the interface transmit time interval by a predefined factor, i.e., 2, to obtain an updated value for the interface transmit time interval, i.e., 10 ms, which is assigned to the new top layer of the control stack 502. The processing device further calculates an updated or scaled value for the interface transmit time interval by multiplying the actual value of the interface transmit time interval, i.e., 10 ms, by a predefined factor associated with the regular priority, i.e., 3 to obtain a value for the transmission time gap equal to 30 ms. The pacing timer is then set to the scaled value of the interface transmit time interval, i.e., 30 ms. The processing device then generates a second LSU packet comprising the 7 regular priority LSAs and transmits the second LSU packet concurrently to the start of the pacing timer. The processing device further assigns the number of LSAs inserted into the LSU packet, i.e., 7, to the newly created top layer of the control stack 502 and the value of the interface transmit time interval, i.e., 10 ms, to the newly created top layer of the control stack 502.

At time $t_3$ and as illustrated in FIG. 5d, the pacing timer naturally pops. Since the transmission of the second LSU packet, no LSA acknowledgement was received from the second computing device 220, but 6 LSAs having a low priority was received. It should be understood that since the number of received LSA acknowledgement is less than the number of LSAs transmitted in the second LSU packet, the pacing timer was not forced popped. The 6 received LSAs are inserted at the head of the queue 500 since there is no other LSA present in the queue 500. Since the pacing timer naturally popped, the processing device creates a new top layer at the top of the control stack 502 and increases the value of the interface transmit time interval. In the present example, the processing device multiplies the value of the interface transmit time interval by the predefined factor, i.e., 2, to obtain an updated value for the interface transmit time interval, i.e. 20 ms, which is assigned to the new top layer of the control stack 502. The processing device further calculates an updated or scaled value for the interface transmit time interval by multiplying the actual value of the interface transmit time interval, i.e., 20 ms, by a predefined factor associated with the low priority, i.e., 10, to obtain a value for the transmission time gap equal to 200 ms. The pacing timer is then set to the scaled value of the interface transmit time interval, i.e., 200 ms. The processing device then generates a third LSU packet comprising the 6 low priority LSAs and transmits the third LSU packet concurrently to the start of the pacing timer. The processing device further assigns the number of LSAs inserted into the LSU packet, i.e., 6, to the newly created top layer of the control stack 502 and the value of the interface transmit time interval, i.e., 20 ms, to the newly created top layer of the control stack 502.

At time $t_4$ and as illustrated in FIG. 5e, the number of LSA acknowledgments received from the second computing device 220, i.e. 8 received LSA acknowledgments, is greater than the number of LSAs transmitted in the previous LSU packet, i.e., greater than the number of LSAs included into the third LSU packet which is 6 LSAs. The processing device then stops the pacing timer before its expiry, i.e., it forced pops the pacing timer, and decreases the value of the interface transmit time interval by dividing the value of the interface transmit time interval, i.e., 20 ms, by the predefined factor, i.e. 2, to obtain an updated value for the interface transmit time interval, i.e., 10 ms. The processing device further subtracts the number of received acknowledgements from the top of the control stack 502. Since the number of received LSA acknowledgements, i.e. 8, is greater than the number of unacknowledged LSAs associated with the top layer, the processing device subtracts the number of received LSA acknowledgements from the number of unacknowledged LSAs associated with the top layer, which becomes 0, and from the number of unacknowledged LSAs associated with the second top layer, which becomes 5. Since the number of unacknowledged LSAs associated with the top layer is 0, the processing device removes the top layer from the stack 502 and the second top (penultimate) layer having associated thereto a number of unacknowledged LSAs equal to 5 becomes the top layer of the stack 502. Furthermore, at step 4, the queue 500 is empty, i.e., no LSA is waiting to be transmitted. The pacing timer remains in its inactive state.

At time $t_5$ and as illustrated in FIG. 5f, while the pacing timer has an inactive status, the first computing device 210 receives 4 regular priority LSAs. The 4 received LSAs are inserted at the head of the queue 500 since there is no other LSA present in the queue 500. The processing device generates a fourth LSU packet comprising the 4 regular priority LSAs and transmits the fourth LSU packet to the second computing device 220 via the communication interface. The processing device also determines an updated or scaled value for the interface transmit time interval be multiplying the actual value of the interface transmit time interval, i.e., 10 ms, by the factor associated with the regular priority, i.e., 3, to obtain an updated value for the transmission time gap equal to 30 ms. The pacing timer is then set to the scaled value of the interface transmit time interval, i.e., 30 ms. It should be understood that the pacing timer having the 30 ms value is started concurrently with the transmission of the fourth LSU packet. Since the previous pacing timer was forced popped, the processing device does not create a new top layer in the control stack 502 and adds the number of LSAs contained in the fourth LSU packet to the actual top layer which is now assigned a number of unacknowledged LSAs equal to 9.

At time $t_6$ and as illustrated in FIG. 5g, the number of LSA acknowledgements received since the transmission of the fourth LSU packet is equal to the number of LSAs included into the fourth LSU packet. The processing device then forced pops the pacing timer and subtracts the received number of LSA acknowledgements, i.e. 4 LSA acknowledgements, from the top layer of the stack 502 which becomes now associated with 5 unacknowledged LSAs. Since no LSA to be transmitted was received from the transmission of the fourth LSU packet, the queue 500 is now empty, and the pacing timer remains in its inactive state. It should be noted that the interface transmit time interval is not adjusted since the number of unacknowledged LSAs associated with the top layer is not equal to 0.

In some embodiments, a dynamic adjustment of the interface transmit time interval is used to specify the minimum time interval between two consecutive transmissions of the LSU packets and control the rate of the LSA flooding if a large number of LSAs are to be flooded. The interface transmit time interval is adjusted individually for each interface. Concurrently with a flooding event, i.e. with the transmission of an LSU packet, on a particular interface, a pacing timer is initiated with a duration equal to the dynamically adjusted interface transmit time interval. When enough LSA acknowledgement packets are received within the transmit time interval, the value of the interface transmit time interval is decreased. On the other hand, if the pacing timer naturally pops while not enough acknowledgement packets are received within the interface transmit time interval, the interface transmit time interval is increased.

In some embodiments, a predefined factor by which the interface transmit time interval is increased or decreased is used. When the network starts to get congested, i.e., an acknowledgement is not received for each previously sent LSA, the dynamic time interval value is increased by the predefined factor. If the network becomes free again and an acknowledgment is received for each previously transmitted LSA within the interface transmit time interval, the interface transmit time interval value is decreased by the predefined factor.

In some non-limiting embodiments, the above-described methods and systems can be used in an electrical-layer/optical channel data unit (ODU) automatically switched optical network (ASON), an optical-layer/dense wave-length-division multiplexing (DWDM) ASON, an internet protocol (IP) routing network, and/or the like since fast network convergence is usually important in both optical and IP routing networks due to its impact on the network reliability, performance and the user experience.

In optical networks, rapid convergence usually ensures efficient utilization of bandwidth resources while minimizing service disruptions and latency for high-speed data transmissions.

Similarly, in IP routing networks, swift convergence usually enhances the resilience of the network by quickly restoring connectivity in the event of link failures or network topology changes.

In some non-limiting embodiments, the above-described methods and systems can be used to enhance the flooding feature of a link-state routing protocol such as open shortest path first (OSPF) Version 2, OSPF for IPv6, Intermediate System to Intermediate System (IS-IS) Intra Domain Routing Protocol, or the like.

In some non-limiting embodiments of the present technology, the dynamic adjustment of the interface transmit time interval provides a fast network convergence compared to the fixed interface transmit time interval scheme which improves the network connection (or service) recovery reliability.

In some non-limiting embodiments of the present technology, the control stack used to track the number of unacknowledged LSAs allows a prompt response to the number of acknowledged LSAs from a neighbor computing device which contributes to improve the network convergence delay.

In some non-limiting embodiments of the present technology, the use of the queue allows for the routing information LSAs of which the flooding affects the network convergence delay to be transmitted with the highest priority and transmission rate which improves the network convergence delay. On the other hand, the traffic engineering and refresh LSAs are transmitted with a lower priority and transmission rate which lowers the CPU and memory usage and maintains the network stability once a huge number of LSAs are flooded through the network.

It should be expressly understood that not all technical effects mentioned herein need to be enjoyed in each and every implementation of the present technology. For example, embodiments of the present technology may be implemented without the user enjoying some of these technical effects, while other non-limiting embodiments may be implemented with the user enjoying other technical effects or none at all.

Some of these steps and signal sending-receiving are well known in the art and, as such, have been omitted in certain portions of this description for the sake of simplicity. The signals can be sent-received using optical means (such as a fiber-optic connection), electronic means (such as using wired or wireless connection), and mechanical means (such as pressure-based, temperature-based or any other suitable physical parameter based).

Modifications and improvements to the above-described embodiments of the present technology may become apparent to those skilled in the art. The foregoing description is intended to be exemplary rather than limiting.

FURTHER EXAMPLES

This disclosure also includes the following non-limiting examples, which include examples of embodiments described and illustrated herein.

1. A method for adjusting a transmit time interval for a transmission of a link state update (LSU) packet, the method being executed by a processor, the method comprising: accessing a storing unit having stored thereon a stack comprising at least one timely ordered layer, each layer being associated with a respective number of unacknowledged link state advertisements (LSAs) previously transmitted at a respective transmission time; receiving, via a communication interface, a given number of acknowledgements; subtracting the given number of acknowledgements from a top layer of the stack, thereby obtaining an updated number of unacknowledged LSAs for the top layer; determining an updated value for an interface transmit time interval based on the updated number of unacknowledged LSAs for the top layer; setting a pacing timer to the updated value for the interface transmit time interval; concurrently transmitting, via the communication interface, a given LSU packet comprising at least one given LSA and starting the pacing timer; and adding a number of the at least one given LSA to a top of the stack.

2. The method of example 1, wherein said determining an updated value comprises, when the updated number of unacknowledged LSAs for the top layer is equal to zero: decrementing the interface transmit time interval, thereby obtaining the updated value, the method further comprising removing the top layer from the stack.

3. The method of example 1 or 2, wherein, when, upon expiry of the pacing timer by full elapsing of the interface transmit time interval, a number of previous acknowledgements received from a previous LSU packet transmission is less than a number of previous LSAs transmitted at the previous LSU packet transmission, said adding the number of the at least one given LSA comprises: creating a new layer at the top of the stack and assigning the number of the at least one given LSA to the new layer; and said determining an updated value comprises incrementing the interface transmit time interval.

4. The method of any one of examples 1 to 3, wherein, when the pacing timer is terminated before elapsing of the interface transmit time interval, said adding the number of the at least one given LSA to the top of the stack comprises: adding the number of the at least one given LSA to an actual top layer of the stack.

5. The method of example 4, wherein the pacing timer is terminated before the elapsing of the interface transmit time interval when a number of acknowledgements received from a previous LSU packet transmission is at least equal to a number of previous LSAs transmitted at the previous LSU packet transmission.

6. The method of any one of examples 1 to 5, wherein said subtracting comprises, when the given number of acknowledgements is greater than the respective number of unacknowledged LSAs of the top layer, subtracting the given number of acknowledgements from the top layer and a second layer.

7. The method of any one of examples 1 to 6, further comprising: determining a highest priority associated with the at least one given LSA; and determining a further value for the interface transmit time interval based on the updated value of the interface transmit time interval and the highest priority, wherein said setting the pacing timer comprises setting the pacing timer to the further value for the interface transmit time interval.

8. The method of example 7, wherein, when the at least one given LSA comprises a plurality of LSAs, said determining the highest priority comprises: determining a respective priority for each one of the plurality of LSAs; queuing the plurality of LSAs according to the respective priority, thereby obtaining a queue of LSAs; and determining the highest priority as being the respective priority of a given of the plurality of LSAs being at the head of the queue of LSAs.

9. The method of any one of examples 1 to 8, wherein each layer of the stack is further associated with a respective value of the interface transmit time interval.

10. A system for adjusting a transmit time interval for a transmission of a link state update (LSU) packet, the system comprising: a processor; a non-transitory storage medium operatively connected to the processor, the non-transitory storage medium comprising computer-readable instructions; the processor, upon executing the instructions, being configured for: accessing a storing unit having stored thereon a stack comprising at least one timely ordered layer, each layer being associated with a respective number of unacknowledged link state advertisements (LSAs) previously transmitted at a respective transmission time; receiving, from a communication interface, a given number of acknowledgements; subtracting the given number of acknowledgements from a top layer of the stack, thereby obtaining an updated number of unacknowledged LSAs for the top layer; determining an updated value for an interface transmit time interval based on the updated number of unacknowledged LSAs for the top layer; setting a pacing timer to the updated value for the interface transmit time interval; concurrently transmitting, via the communication interface, a given LSU packet comprising at least one given LSA and starting the pacing timer; and adding a number of the at least one given LSA to a top layer of the stack.

11. The system of example 10, wherein the processor is configured for, when the updated number of unacknowledged LSAs for the top layer is equal to zero: decrementing the interface transmit time interval, thereby obtaining the updated value, the processor being further configured for removing the top layer from the stack.

12. The system of example 10 or 11, wherein the processor is configured for, when, upon expiry of the pacing timer by full elapsing of the interface transmit time interval, a number of previous acknowledgements received from a previous LSU packet transmission is less than a number of previous LSAs transmitted at the previous LSU packet transmission: creating a new layer at the top of the stack and assigning the number of the at least one given LSA to the new layer; and incrementing the interface transmit time interval, thereby obtaining the updated value.

13. The system of any one of examples 10 to 13, wherein the processor is configured for, when the pacing timer is terminated before elapsing of the interface transmit time interval: adding the number of the at least one given LSA to an actual top layer of the stack.

14. The system of example 13, wherein the pacing timer is terminated before the elapsing of the interface transmit time interval when a number of acknowledgements received from a previous LSA transmission is at least equal to a number of previous LSAs transmitted at the previous LSA transmission.

15. The system of any one of examples 10 to 14, wherein the processor is configured for, when the given number of acknowledgements is greater than the respective number of unacknowledged LSAs of the top layer, subtracting the given number of acknowledgements from the top layer and a second layer.

16. The system of any one of examples 10 to 15, wherein the processor is further configured for: determining a highest priority associated with the at least one given LSA; and determining a further value for the interface transmit time interval based on the updated value of the interface transmit time interval and the highest priority, wherein said setting the pacing timer comprises setting the pacing timer to the further value for the interface transmit time interval.

17. The system of example 16, wherein the processor is configured for, when the at least one given LSA comprises a plurality of LSAs: determining a respective priority for each one of the plurality of LSAs; queuing the plurality of LSAs according to the respective priority, thereby obtaining a queue of LSAs; and determining the highest priority as being the respective priority of a given of the plurality of LSAs being at the head of the queue of LSAs.

18. The system of any one of examples 10 to 17, wherein each layer of the stack is further associated with a respective value of the interface transmit time interval.

19. A method for transmitting a link state update (LSU) packet, the method being executed by a processor, the method comprising: receiving a given link state advertisement (LSA) to be transmitted; determining a given priority associated with the given LSA, the given priority being selected from a group comprising at least a top priority and another priority; if a pacing timer has an inactive status and the given priority corresponds to the top priority, instantly transmitting a given LSU comprising the given LSA; and if the pacing timer is running and the given priority is greater than a previous priority associated with a previous LSA transmitted at a previous transmission time, transmitting a further LSU comprising at least the given LSA before an expiry of the pacing timer.

20. The method of example 19, wherein the top priority is assigned to a content update LSA without traffic engineering extension.

21. The method of example 19 or 20, wherein the given priority is selected between the top priority, a medium priority and a low priority.

22. The method of example 21, wherein the medium priority is assigned to a content update LSA with traffic engineering extension.

23. The method of example 21 or 22, wherein the low priority is assigned to a refresh LSA.

24. The method of any one of examples 19 to 23, wherein said receiving the given LSA comprises receiving the given LSA and a further LSA, the method further comprising: determining that a further priority associated with the further LSA is different from the top priority and is less than the previous priority associated with the previous LSA transmitted; and queuing the further LSA according to the further priority.

25. The method of any one of examples 19 to 23, wherein a size of the further LSU corresponds to a maximum transmit unit.

26. The method of any one of examples 19 to 25, further comprising starting the pacing timer set to an interface transmit time interval concurrently with said instantly transmitting the given LSU.

27. The method of any one of examples 19 to 26, further comprising if the given priority is greater than a previous priority: stopping the pacing timer; and starting a new timer set to an interface transmit time interval concurrently with said transmitting the further LSU.

28. The method of any one of examples 19 to 27, wherein said instantly transmitting the given LSU comprises transmitting the given LSU without waiting for a reception of a further LSA.

29. A system for adjusting a transmit time interval for a transmission of a link state update (LSU) packet, the system comprising: a processor; a non-transitory storage medium operatively connected to the processor, the non-transitory storage medium comprising computer-readable instructions; the processor, upon executing the instructions, being configured for: receiving a given link state advertisement (LSA) to be transmitted; determining a given priority associated with the given LSA, the given priority being selected from a group comprising at least a top priority and another priority; if, when a pacing timer has an inactive status, the given priority corresponds to the top priority, instantly transmitting a given LSU comprising the given LSA; and if, when the pacing timer is running, the given priority is greater than a previous priority associated with a previous LSA transmitted at a previous transmission time, transmitting a further LSU comprising at least the given LSA before an expiry of the pacing timer.

30. The system of example 29, wherein the top priority is assigned to a content update LSA without traffic engineering extension.

31. The system of example 29 or 30, wherein the given priority is selected between the top priority, a medium priority and a low priority.

32. The system of any one of examples 29 to 31, wherein the medium priority is assigned to a content update LSA with traffic engineering extension.

33. The system of example 31 or 32, wherein the low priority is assigned to a refresh LSA.

34. The system of any one of examples 29 to 33, wherein the processor is configured for receiving the given LSA and a further LSA, the processor being further configured for: determining that a further priority associated with the further LSA is different from the top priority and is less than the previous priority associated with the previous LSA transmitted; and queuing the further LSA according to the further priority.

35. The system of any one of examples 29 to 34, wherein a size of the further LSU corresponds to a maximum transmit unit.

36. The system of any one of examples 29 to 35, wherein the processor is further configured for starting the pacing timer set to an interface transmit time interval concurrently with said instantly transmitting the given LSU.

37. The system of any one of examples 29 to 36, wherein the processor is further configured for, if the given priority is greater than a previous priority: stopping the pacing timer; and starting a new timer set to an inter-face transmit time interval concurrently with said trans-mitting the further LSU.

38. The system of any one of examples 29 to 37, wherein the processor is configured for transmitting the given LSU without waiting for a reception of a further LSA.

What is claimed is:

1. A method for adjusting a transmit time interval for a transmission of a link state update (LSU) packet, the method being executed by a processor, the method comprising:
    accessing a storing unit having stored thereon a stack comprising at least one timely ordered layer, each layer being associated with a respective number of unac-knowledged link state advertisements (LSAs) previ-ously transmitted at a respective transmission time;
    receiving, via a communication interface, a given number of acknowledgements;
    subtracting the given number of acknowledgements from a top layer of the stack, thereby obtaining an updated number of unacknowledged LSAs for the top layer;
    determining an updated value for an interface transmit time interval based on the updated number of unac-knowledged LSAs for the top layer;
    setting a pacing timer to the updated value for the inter-face transmit time interval;
    concurrently transmitting, via the communication inter-face, a given LSU packet comprising at least one given LSA and starting the pacing timer; and
    adding a number of the at least one given LSA to a top of the stack.

2. The method of claim 1, wherein said determining an updated value comprises, when the updated number of unacknowledged LSAs for the top layer is equal to zero:
    decrementing the interface transmit time interval, thereby obtaining the updated value,
the method further comprising removing the top layer from the stack.

3. The method of claim 1, wherein, when, upon expiry of the pacing timer by full elapsing of the interface transmit time interval, a number of previous acknowledgements received from a previous LSU packet transmission is less than a number of previous LSAs transmitted at the previous LSU packet transmission, said adding the number of the at least one given LSA comprises:
    creating a new layer at the top of the stack and assigning the number of the at least one given LSA to the new layer; and
    said determining an updated value comprises increment-ing the interface transmit time interval.

4. The method of claim 1, wherein, when the pacing timer is terminated before elapsing of the interface transmit time interval, said adding the number of the at least one given LSA to the top of the stack comprises:

adding the number of the at least one given LSA to an actual top layer of the stack.

5. The method of claim 4, wherein the pacing timer is terminated before the elapsing of the interface transmit time interval when a number of acknowledgements received from a previous LSU packet transmission is at least equal to a number of previous LSAs transmitted at the previous LSU packet transmission.

6. The method of claim 1, wherein said subtracting comprises, when the given number of acknowledgements is greater than the respective number of unacknowledged LSAs of the top layer, subtracting the given number of acknowledgements from the top layer and a second layer.

7. The method of claim 1, further comprising:
    determining a highest priority associated with the at least one given LSA; and
    determining a further value for the interface transmit time interval based on the updated value of the interface transmit time interval and the highest priority,
wherein said setting the pacing timer comprises setting the pacing timer to the further value for the interface transmit time interval.

8. The method of claim 7, wherein, when the at least one given LSA comprises a plurality of LSAs, said determining the highest priority comprises:
    determining a respective priority for each one of the plurality of LSAs;
    queuing the plurality of LSAs according to the respective priority, thereby obtaining a queue of LSAs; and
    determining the highest priority as being the respective priority of a given of the plurality of LSAs being at the head of the queue of LSAs.

9. The method of claim 1, wherein each layer of the stack is further associated with a respective value of the interface transmit time interval.

10. A system for adjusting a transmit time interval for a transmission of a link state update (LSU) packet, the system comprising:
    a processor;
    a non-transitory storage medium operatively connected to the processor, the non-transitory storage medium com-prising computer-readable instructions;
    the processor, upon executing the instructions, being configured for:
        accessing a storing unit having stored thereon a stack comprising at least one timely ordered layer, each layer being associated with a respective number of unacknowledged link state advertisements (LSAs) previously transmitted at a respective transmission time;
        receiving, from a communication interface, a given number of acknowledgements;
        subtracting the given number of acknowledgements from a top layer of the stack, thereby obtaining an updated number of unacknowledged LSAs for the top layer;
        determining an updated value for an interface transmit time interval based on the updated number of unac-knowledged LSAs for the top layer;
        setting a pacing timer to the updated value for the interface transmit time interval;
        concurrently transmitting, via the communication inter-face, a given LSU packet comprising at least one given LSA and starting the pacing timer; and
        adding a number of the at least one given LSA to a top layer of the stack.

11. The system of claim 10, wherein the processor is configured for, when the updated number of unacknowledged LSAs for the top layer is equal to zero:

decrementing the interface transmit time interval, thereby obtaining the updated value, the processor being further configured for removing the top layer from the stack.

12. The system of claim 10, wherein the processor is configured for, when, upon expiry of the pacing timer by full elapsing of the interface transmit time interval, a number of previous acknowledgements received from a previous LSU packet transmission is less than a number of previous LSAs transmitted at the previous LSU packet transmission:

creating a new layer at the top of the stack and assigning the number of the at least one given LSA to the new layer; and incrementing the interface transmit time interval, thereby obtaining the updated value.

13. The system of claim 10, wherein the processor is configured for, when the pacing timer is terminated before elapsing of the interface transmit time interval:

adding the number of the at least one given LSA to an actual top layer of the stack.

14. The system of claim 13, wherein the pacing timer is terminated before the elapsing of the interface transmit time interval when a number of acknowledgements received from a previous LSA transmission is at least equal to a number of previous LSAs transmitted at the previous LSA transmission.

15. The system of claim 10, wherein the processor is configured for, when the given number of acknowledgements is greater than the respective number of unacknowledged LSAs of the top layer, subtracting the given number of acknowledgements from the top layer and a second layer.

16. The system of claim 10, wherein the processor is further configured for:

determining a highest priority associated with the at least one given LSA; and determining a further value for the interface transmit time interval based on the updated value of the interface transmit time interval and the highest priority, wherein said setting the pacing timer comprises setting the pacing timer to the further value for the interface transmit time interval.

17. The system of claim 16, wherein the processor is configured for, when the at least one given LSA comprises a plurality of LSAs:

determining a respective priority for each one of the plurality of LSAs;

queuing the plurality of LSAs according to the respective priority, thereby obtaining a queue of LSAs; and determining the highest priority as being the respective priority of a given of the plurality of LSAs being at the head of the queue of LSAs.

18. The system of claim 10, wherein each layer of the stack is further associated with a respective value of the interface transmit time interval.

\* \* \* \* \*